(12) United States Patent
Wolters

(10) Patent No.: US 7,107,339 B1
(45) Date of Patent: Sep. 12, 2006

(54) PREDICTIVE MONITORING AND PROBLEM IDENTIFICATION IN AN INFORMATION TECHNOLOGY (IT) INFRASTRUCTURE

(75) Inventor: Timothy Jerome Wolters, Superior, CO (US)

(73) Assignee: WebMethods, Inc., Fairfax, VA (US)

( * ) Notice: Subject to any disclaimer, the term of this patent is extended or adjusted under 35 U.S.C. 154(b) by 657 days.

(21) Appl. No.: 10/112,015

(22) Filed: Mar. 29, 2002

Related U.S. Application Data

(60) Provisional application No. 60/281,991, filed on Apr. 7, 2001, provisional application No. 60/282,363, filed on Apr. 7, 2001.

(51) Int. Cl.
  *G06F 15/177* (2006.01)
(52) U.S. Cl. ............................... 709/224; 714/39
(58) Field of Classification Search ................ 709/224, 709/223; 345/763; 714/47, 33
  See application file for complete search history.

(56) References Cited

U.S. PATENT DOCUMENTS

| | | | | |
|---|---|---|---|---|
| 5,974,457 | A * | 10/1999 | Waclawsky et al. | 709/224 |
| 5,987,442 | A * | 11/1999 | Lewis et al. | 706/10 |
| 6,269,401 | B1 * | 7/2001 | Fletcher et al. | 709/224 |
| 6,308,174 | B1 * | 10/2001 | Hayball et al. | 707/10 |
| 6,317,786 | B1 * | 11/2001 | Yamane et al. | 709/224 |
| 6,393,387 | B1 * | 5/2002 | Adriaans et al. | 703/27 |
| 6,446,123 | B1 * | 9/2002 | Ballantine et al. | 709/224 |
| 6,553,403 | B1 * | 4/2003 | Jarriel et al. | 709/202 |
| 6,578,077 | B1 * | 6/2003 | Rakoshitz et al. | 709/224 |
| 6,684,120 | B1 * | 1/2004 | Oku et al. | 700/108 |
| 6,738,811 | B1 * | 5/2004 | Liang | 709/224 |
| 6,804,714 | B1 * | 10/2004 | Tummalapalli | 709/224 |
| 2001/0052087 | A1 * | 12/2001 | Garg et al. | 714/37 |
| 2003/0088663 | A1 * | 5/2003 | Battat et al. | 709/224 |
| 2003/0149754 | A1 * | 8/2003 | Miller et al. | 709/223 |
| 2003/0202112 | A1 * | 10/2003 | Bowman et al. | 348/261 |
| 2004/0128370 | A1 * | 7/2004 | Kortright | 709/221 |

FOREIGN PATENT DOCUMENTS

WO    WO01/86437    11/2001

OTHER PUBLICATIONS

Panacya™, 2001, Discovering Layer 8: The Quest for eService Management™, Downloaded on Mar. 28, 2002 from www.panacya.com, pp. 1-8.
Altaworks, 2001, "From Lost Cause to Root Cause", Downloaded on Mar. 28, 2002 from www.altaworks.com, pp. 1-20.
"Transaction Vision® Technical White Paper." Bristol Technology. Jun. 2005. pp. 1-17.

\* cited by examiner

*Primary Examiner*—Bunjob Jaroenchonwanit
*Assistant Examiner*—Julian Chang
(74) *Attorney, Agent, or Firm*—Hamilton & DeSanctis

(57) ABSTRACT

An information technology (IT) infrastructure may be monitored, and the data thus collected may be used to infer problems and predict future conditions. In one embodiment, the present invention may include receiving a plurality of component metrics, each component metric related to a corresponding component of an (IT) infrastructure of an enterprise, each component being associated with one or more gross-level rules, and generating an indicator set by comparing each received component metric to relevant historical values of the component metric. In one embodiment, the present invention may also include determining that a gross-level rule is out of compliance, comparing the indicator set to one or more historical indicator sets to determine whether the indicator set resembles any of the one or more historical indicator sets, and performing an appropriate action based on the result of the comparison.

47 Claims, 6 Drawing Sheets

PREDICTIVE MONITORING AND PROBLEM IDENTIFICATION IN AN INFORMATION TECHNOLOGY (IT) INFRASTRUCTURE

CROSS REFERENCE TO RELATED APPLICATIONS

This application claims the benefit of U.S. Provisional Application Nos. 60/281,991, and 60/282,363, filed Apr. 7, 2001 both of which are incorporated herein by reference.

BACKGROUND OF THE INVENTION

1. Field of the Invention

The present invention applies to the field of monitoring and maintaining an enterprise's information technology infrastructure and, in particular, to predicting performance irregularities in an enterprise's information technology infrastructure, and inferring possible problems causing the irregularities.

2. Description of the Related Art

Modern businesses rely on information technology (IT) to assist in carrying out business tasks. An enterprise's IT infrastructure needs to consistently perform to specification to ensure the success of the business. The IT infrastructure may be used for an enterprise's communication, database management, inventory tracking, shipment records, website management, business-to-business (B2B) ecommerce, business-to-consumer (B2C) ecommerce, accounting, billing, order tracking, customer support tracking, document management, and a possibly infinite number of other tasks. The IT infrastructure is made up of numerous components such as servers, hubs, switches, computers, the links connecting these devices, the software applications running these devices, and so on. Each of these components generally has numerous subcomponents such as a central processing unit (CPU), bus, memory, and similar high-level electrical components. The proper functioning of the IT infrastructure in large part depends on the proper functioning of these components and subcomponents.

Recognizing the importance of proper functioning, various monitoring tools have been developed to measure the performance of components and subcomponents. For example, a monitor may alter states depending on whether a computer is online or offline. If the monitor indicates the computer is offline, technicians may need to take action to put it back online, or switch to a backup computer. For relatively simple and small-scale IT infrastructures such monitoring may be adequate. However, some enterprises have IT infrastructures so large and complex that merely having information about individual components or subcomponents may not be very helpful.

For example, in a large-scale IT infrastructure that may include many servers, having a particular combination of sever failures may not cause a problem. However, if a server failure combination does cause a problem so that the enterprise's website stops functioning properly, it may not be quickly determined which server or servers of the failed servers are the critical servers causing the problem. The IT technicians receive no assistance from prior art monitors in how to prioritize technical involvement or in identifying what specific combination of components or subcomponents may be the cause of the particular problem. Furthermore, prior art monitors are incapable of predicting when problems or out-of-compliance conditions, i.e. performance irregularities may occur. Thus, IT technicians must wait until the IT infrastructure fails to function according to specification, and then they must find the cause of the failure without assistance from the monitors, other than the raw data they provide.

BRIEF SUMMARY

An information technology (IT) infrastructure may be monitored, and the data thus collected may be used to infer problems and predict future conditions. In one embodiment, the present invention may include receiving a plurality of component metrics, each component metric related to a corresponding component of an (IT) infrastructure of an enterprise, each component being associated with one or more gross-level rules, and generating an indicator set by comparing each received component metric to relevant historical values of the component metric. In one embodiment, the present invention may also include determining that a gross-level rule is out of compliance, comparing the indicator set to one or more historical indicator sets to determine whether the indicator set resembles any of the one or more historical indicator sets, and performing an appropriate action based on the result of the comparison.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

IT Infrastructure Monitoring

Embodiments of the present invention combine measurements from numerous monitors. These monitors collect data from a number of components and subcomponents of an enterprise's IT infrastructure, and provide the data regarding each of the components. Using the combined measurements, historical values of the monitors, and statistical analysis, embodiments of the present invention can predict that the IT infrastructure will not perform up to specification in the future. If the IT infrastructure is already not performing up to specification, embodiments of the present invention can suggest possible problems causing the out-of-compliance condition, and may even suggest solutions to those problems. This may be accomplished by using combined measurements and statistical analysis in a process herein referred to as "fingerprinting." As used in this description, a fingerprint is synonymous with the term "indicator set," a more general if somewhat less colorful term. The generation of fingerprints—indicator sets—is described in detail further below.

Figure 1:
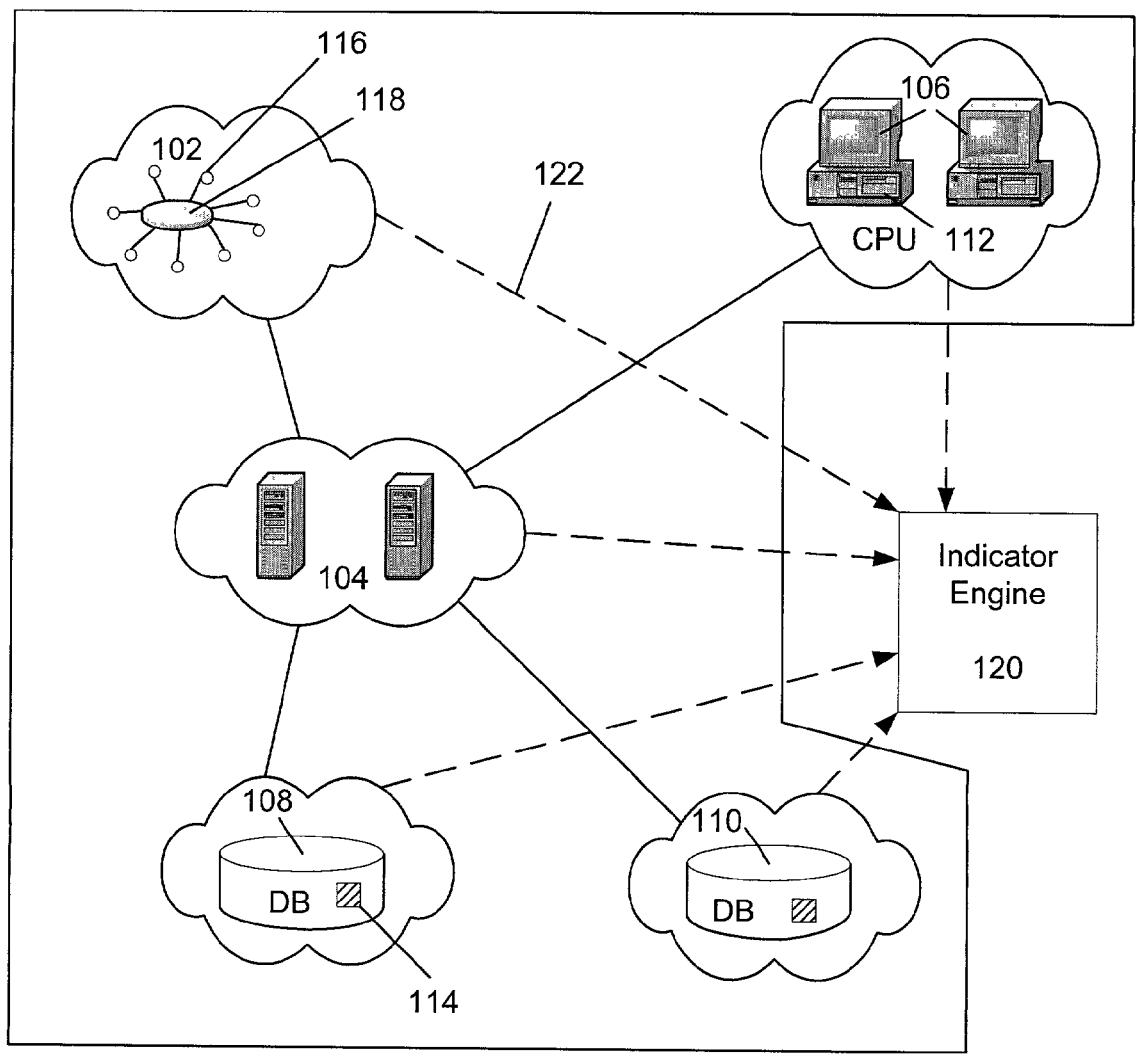
FIG. 1 is a block diagram of an exemplary IT infrastructure that may be monitored using an embodiment of the invention.

Embodiments of the present invention may be used to monitor an enterprise's IT infrastructure. The collection of monitor data is now described with reference to FIG. 1. FIG. 1 shows an example IT infrastructure 100. This infrastructure 100 includes various networks, such as local area network (LAN) 102, servers, such as servers 104, end-user workstations or clients, such as workstations 106, and databases, such as databases 108 and 110. The Servers 104 may come in many varieties for different functions, including message queuing servers, application servers, web servers, departmental servers, and enterprise software servers. This is a highly simplified IT infrastructure used here to ease understanding of the embodiments described. An actual infrastructure may contain thousands of components, and may contain numerous components not shown in FIG. 1. Examples of some other components may include load balancing equipment, switching equipment, various communications devices such as wireless devices and antennas, and a multitude of other IT equipment. Some example subcomponents are also shown in FIG. 1, such as CPU 112 on a workstation from the workstations 106, and the level of memory use 114 on the database 108. These and other IT components may be monitored in a number of different ways. Examples of component monitoring may include measuring disk utilization, network volume and throughput, and error types and error volume. Furthermore, monitoring may be software application-specific, measuring such application performance metrics as cache performance, queue performance, and other application-specific metrics.

Monitors may gather data related to many levels of the IT infrastructure. For example, LAN 102 may have a monitor to measure performance of the LAN 102 as a whole, one or more monitors to measure the performance of various nodes 116 of the LAN 102, and one or more monitors to measure the performance of the switching apparatus 118 used to connect the LAN 102. Furthermore, monitors may be associated with each component of each node 116 and the switching apparatus 118. The data collected by these monitors may then communicated to an Indicator Engine 120 via communications link 122, represented in FIG. 1 as a dotted line. All other dotted lines in FIG. 1 represent a way for the monitors of the components, subcomponents, and sub-subcomponents to report the collected raw data and/or processed data to the Indicator Engine 120. The Indicator Engine may be located or implemented anywhere inside or outside of the IT infrastructure 100. For example, the Indicator Engine 120 may be resident on one of the servers 104, on one of the end-user workstations 106, or distributed among various servers 104 and workstations 106. In this example, the Indicator Engine 120 is shown as being a separate entity in FIG. 1 to emphasize that it is used to monitor the IT infrastructure.

Figure 2:
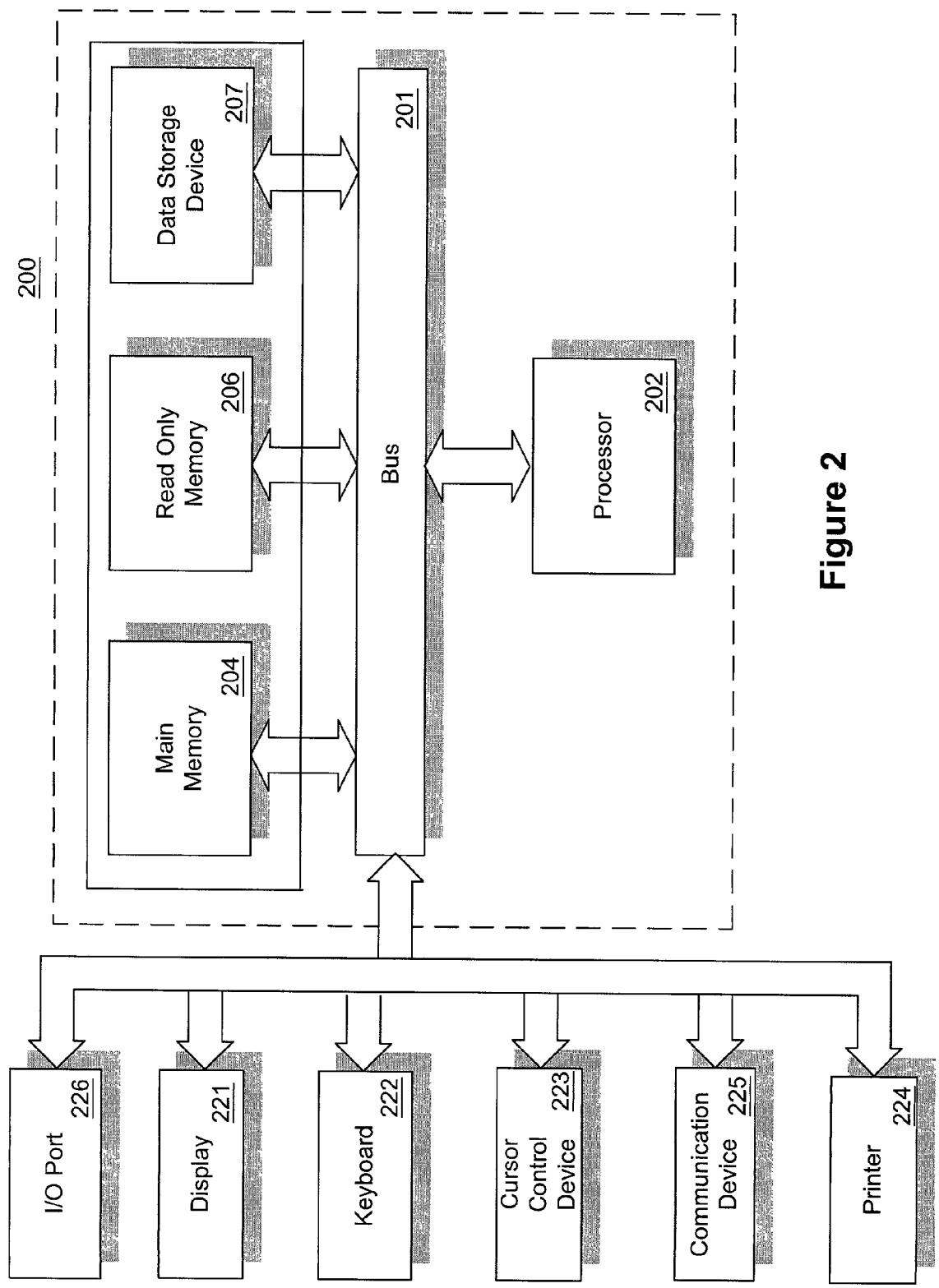
FIG. 2 is an exemplary computer system on which embodiments of the present invention may be practiced.

In one embodiment of the present invention, the Indicator Engine 120 resides on a machine described in detail with reference to FIG. 2. In one embodiment, computer system 200 may be a personal computer. In some embodiments of the invention, certain aspects of the embodiments may be carried out on a specialized device while other aspects may be carried out on a general-purpose computer coupled to the device.

Computer system 200 comprises a bus or other communication means 201 for communicating information, and a processing means such as processor 202 coupled with bus 201 for processing information. In one embodiment of the invention, the tasks performed to practice embodiments of the invention are performed by the processor 202 either directly or indirectly.

Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to bus 201 for storing information and instructions. Computer system 200 can also be coupled via bus 201 to a display device 221, such as a cathode ray tube (CRT) or Liquid Crystal Display (LCD), for displaying information to a computer user. Computer system 200 can also be coupled via bus 201 to a printing device 224, such as a laser printer, or any other printer.

Typically, an alphanumeric input device 222, including alphanumeric and other keys, may be coupled to bus 201 for communicating information and/or command selections to processor 202. Another type of user input device is cursor control 223, such as a mouse. A communication device 225 is also coupled to bus 201 for accessing remote servers or other servers via the Internet, for example. The communication device 225 may include a modem, a network interface card, or other well-known interface devices, such as those used for coupling to an Ethernet, token ring, or other types of networks. In any event, in this manner, the computer system 200 may be coupled to a number of clients and/or servers via a conventional network infrastructure, such as a company's Intranet and/or the Internet, for example.

Problem Inference and Out-of-Compliance Prediction

Using the data collected by the monitors deployed throughout the IT infrastructure, the information contained in the aggregation of monitors may be more than the sum of the information reported by the individual monitors. By learning about various collective monitor patterns exhibited by groups of monitors, information may be deduced about unmonitored components, future irregularities, present problems, and other aspects of the IT infrastructure. Using collective monitoring, it may be possible to observe conditions conducive to IT infrastructure breakdowns. Using artificial intelligence (AI), it may also be possible for a monitoring solution to improve these predictive powers based on the past performance of individual IT infrastructures. Furthermore, using collective monitoring, it may be possible to self-heal the IT infrastructure either before a problem even occurs, or after it has occurred. Artificial intelligence (AI) may also be used to allow the monitoring system to learn to better heal the IT infrastructure over time. In one embodiment, collective monitoring is achieved by using fingerprints or indicator sets.

Generating the Indicator Set

The specifications for an IT infrastructure may be provided in terms of gross-level rules. A gross-level rule, such as a business rule, indicates the expected or desired functioning of the IT infrastructure. For example, a gross-level rule may specify a maximum or average response time for a web server request. Another gross-level rule may similarly specify the number of order lines that should be processed per second. Other gross-level rules may give constraints on transaction throughput. There are many other various gross-level rules, some of which may be unique to the enterprise whose IT infrastructure is being monitored. The IT infrastructure may be said to be functioning according to specification if all, or at least a certain minimum number, of the gross-level rules are in compliance. If a gross-level rule is not in compliance, corrective action may be desired.

An actual monitoring system according to embodiments of the present invention may consider all gross-level rules. However, for simplicity, only compliance with one gross-level rule is considered in the following discussion. Also, since not all components are related to all gross-level rules, the following discussion assumes that a gross-level rule has been selected for analysis, and that the components and subcomponents that may affect the gross-level rule have been identified.

Figure 3:
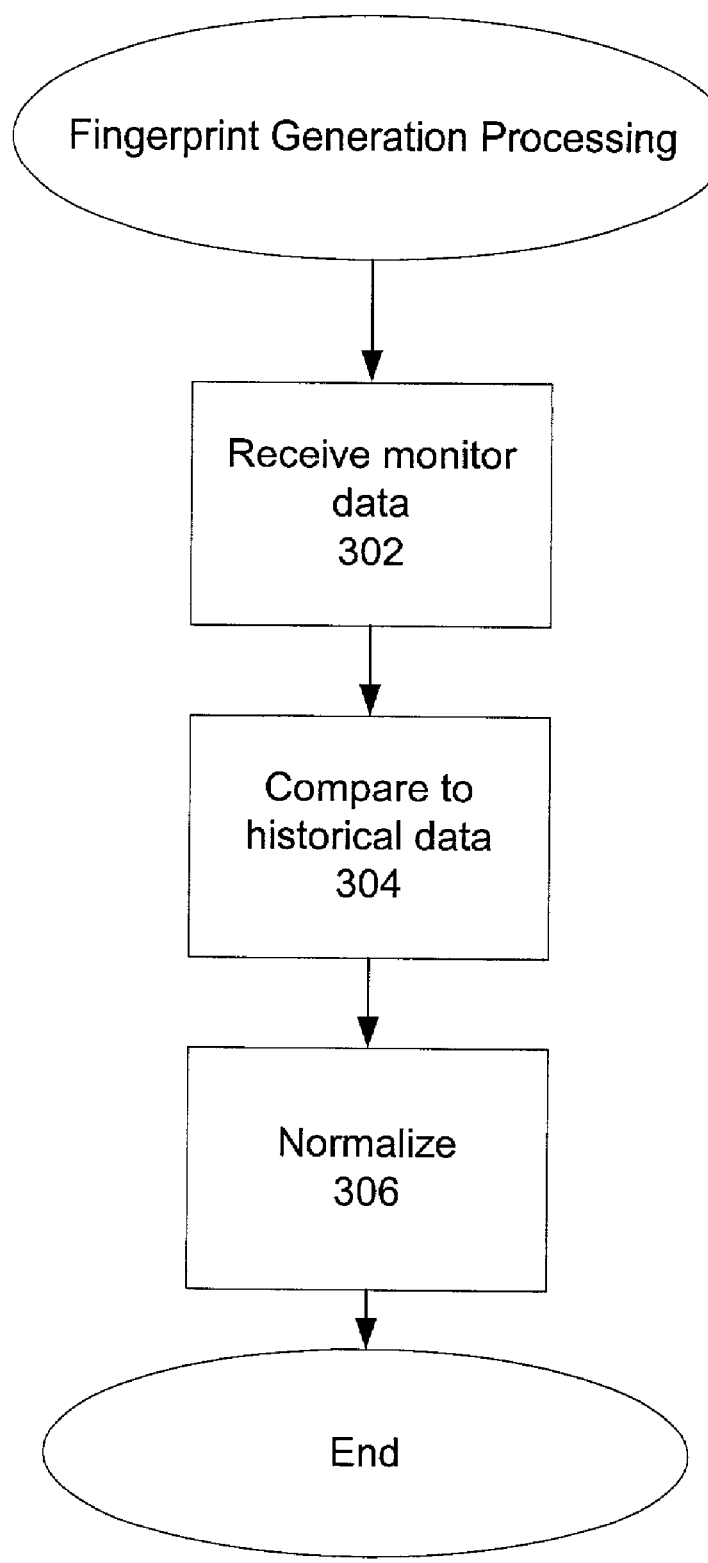
FIG. 3 is a flow chart illustrating fingerprint creation according to one embodiment of the invention.

Once the components that are relevant to a gross-level rule are identified, an indicator set for the gross-level rule can be created. The generation of the indicator set, or fingerprint, is now described with reference to FIG. 3. First, all or a critical number of monitors report their measurements, referred to herein as component metrics, and these component metrics are received 302 at the Indicator Engine. These measurements may be timestamped or synchronized, if temporal measurement synchronization is desired. The measurements may be collected periodically. There may be numerous triggering events to be used to commence the fingerprint creation process.

The measurements received from the monitors may be in various forms and formats. A measurement may be raw data such as "memory utilization 70 percent." The measurement may be statistically or otherwise preprocessed. The measurement may also be a monitor state. Such a state may be binary, e.g., "computer on/off-line," or graduated, e.g. "CPU usage high/medium/low." Other states are also possible, such as trend indicator states, for example, "CPU usage increasing/decreasing." Statistical states may also be used, such as "CPU usage outside normal range."

When the raw monitor measurements, i.e., component metrics, are collected, each component metric may be compared 304 with historical values or statistics for the component metrics. For example, if a monitor that measures the usage of a memory unit reports the component metric as 70 percent utilization, the Indicator Engine may compare that metric to an average utilization for that memory unit of 50 percent. The comparison 304, may thus result in the observation that the particular memory element is 20 percent more utilized than average. This intermediate processed measurement is herein referred to as a component statistic.

The comparison 304 may be done in a time or date sensitive manner. That is, the comparison may only be of relevant historical measurements. For example, the average utilization of 50 percent given above may only be true for weekdays. On weekends, the memory utilization may be 20 percent on average. If the component metrics were collected on a weekday, they may be compared to historical weekday component performance only. Similarly, some components may be sensitive to the time of day, day of the week, week of the month, or month of the year. Other less conventional patterns may also be observed and used to change the relevant historical values and averages the component metrics are compared to.

Using further statistical and normalization methods, the results of the comparisons may be expressed 306 as a measurement relating the current state of the component metric to usual performance of the component in a way comparable with other components. This measurement is herein referred to as a component indicator. A component indicator may be some measure of normal variation. Such a measurement may be a standard deviation, difference in percentages, a distance from a mean or median, or various trend indicators, such as "increasing/decreasing." The component indicators may also be a variance, a process control metric, some other statistical measurement, or a normalized version of any of the above measurements. In one embodiment of the invention, the component indicators are numbers normalized to lie between zero and one, with zero indicating completely normal component performance, and one indicating completely irregular performance. The normalization may also be accomplished using a Fermi-Dirac probability distribution curve. This curve maps the number of standard deviations a metric is away from the mean to a number between 0 and 1. In one embodiment, the Fermi-Dirac curve is adjusted to map one standard deviation to the value 0.5.

For example, if the average utilization of the memory element monitored above is 50 percent, a component metric of 60 percent may result in a component indicator around 0.4, while a component metric of 70 percent may result in a component indicator around 0.6, since 70 percent is more irregular than 60 percent for this particular component. These numbers are given only for demonstration. The precise numbers may vary widely depending on the exact statistical and normalization calculations utilized. For example, the component indicators may be normalized to lie between zero and 100, or any other range, without any substantial alteration to the embodiments here discussed.

The collection of component indicators associated with a gross-level rule is herein referred to either as an indicator set, or a fingerprint. If all components of the IT infrastructure being monitored are used to generate the indicator set, it is referred to as a global indicator set, or global fingerprint. Fingerprints for each individual gross-level rule may then be generated by taking only the component indicators from the global fingerprint that are associated with, i.e., contribute to, each gross-level rule.

Figure 4:
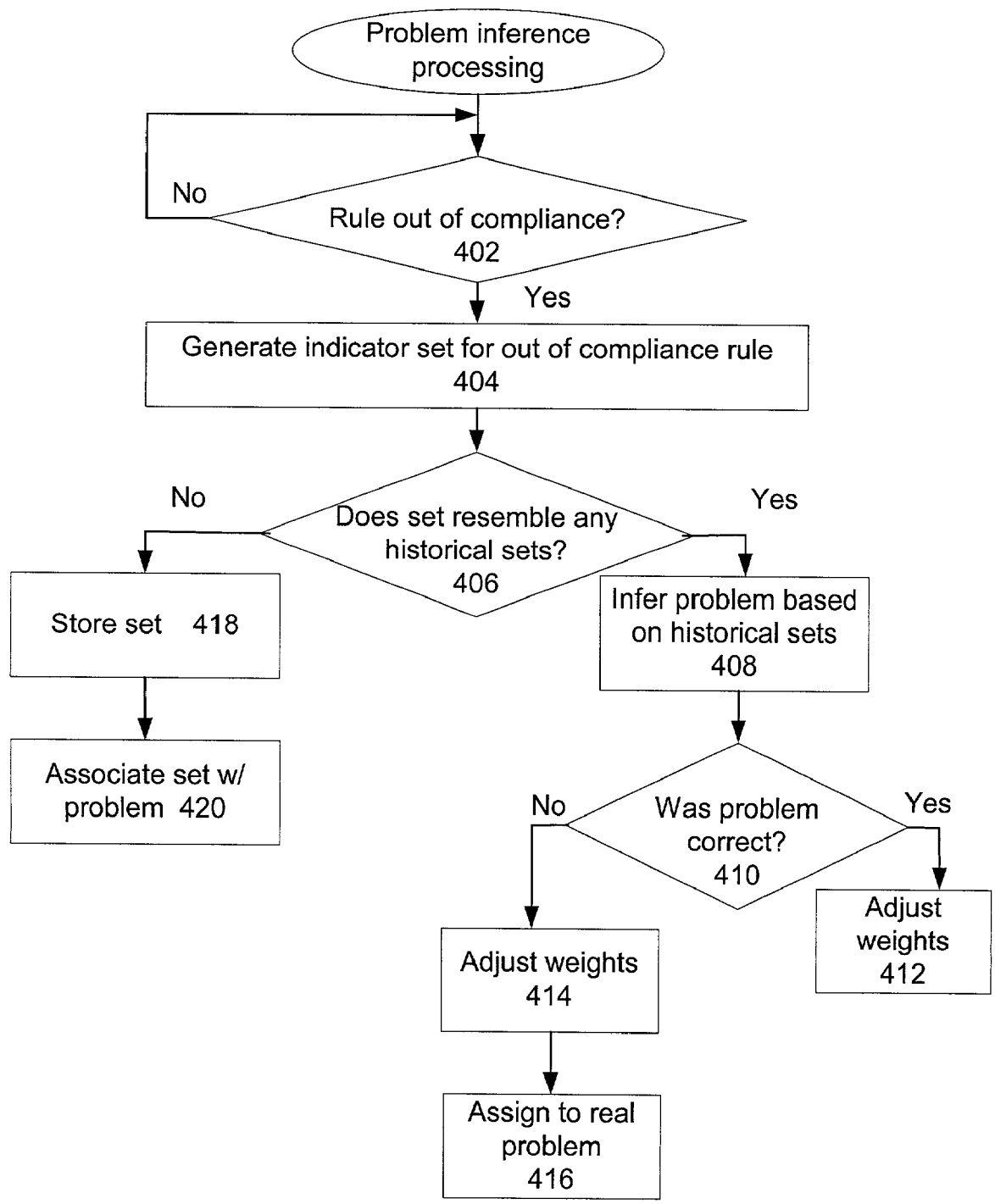
FIG. 4 is a flow chart illustrating problem inference according to one embodiment of the invention.

Embodiments of the present invention may be used to predict gross-level rule out-of-compliance, to infer a problem causing an already existing out-of-compliance condition, or a combination of both. How the embodiments may be used depends on whether the particular gross-level rule of interest is out of compliance at the time the fingerprint is generated. Exemplary processing triggered after a gross-level rule goes out of compliance, will now be described with reference to FIG. 4. Since, the gross-level rule is already out of compliance, these embodiments may be referred to as non-predictive, even though they do infer problems that may be directly or indirectly causing or contributing to the out-of-compliance condition.

Some time after the gross-level rule goes out of compliance, an indicator set may be generated 404. This can be done according to the process described above with reference to FIG. 3. Once the indicator set is generated, it is compared to historical indicator sets 406, to determine if the indicator set sufficiently resembles one or more of these historical indicator sets. The comparison 406 may be carried out in a variety of ways. In one embodiment of the present invention, weights, thresholds, or a combination of weights and thresholds may be used to decide resemblance, as explained below with reference to FIGS. 5A and 5B.

The historical indicator sets may have been generated at some time in the past, and may be stored in some memory element or database somewhere in the IT infrastructure or the Indicator Engine. The historical indicator set may be associated with one or more problems that existed at the time the historical indicator set was generated. Also, a historical indicator set may be associated with one or more fixes or solutions that were used at the time the historical indicator set was generated. For example, if the historical fingerprint was generated when the gross-level rule was out of compliance because a particular memory unit was overloaded, the historical fingerprint may now be associated with the memory unit being overloaded. Furthermore, if in the past reconfiguring a router eased the memory unit's loading, this fix may also be associated with the historical fingerprint.

Also, the historical fingerprint may be stored with some context. For example, the historical fingerprint may be associated with a temporal context, i.e. a time and date of the occurrence of the fingerprint, to aid the comparison. Temporal context may be especially helpful if the component indicators of the historical indicator set are seasonal or time-sensitive, as discussed above. In addition to temporal context, a rule identifier, a fingerprint name, a fingerprint description, and various problem resolution notes may also be stored with the historical indicator set. Another context, such as a relative context, may be used to associate the historical fingerprint to above/below normal monitor conditions.

The indicator set may resemble one or more of the historical indicator sets. In this case, one embodiment of the present invention may infer 408 one or more problems causing the gross-level rule to be out of compliance. This may consist of inferring that a problem that existed in the past when the gross-level rule was out of compliance at a time that the historical indicator set was generated has reoccurred. This inference is based on the statistical likelihood of the indicator set's resembling the historical indicator set.

For example, at some time in the past when the gross-level rule was out of compliance and the historical fingerprint was generated, it may have been determined by a technician that a CPU was crashed somewhere in the IT infrastructure, causing the out-of-compliance condition. The technician, using an embodiment of the present invention that included a user interface, may have associated the problem of the crashed CPU with this fingerprint. That is, the technician may have associated a solution with the historical fingerprint, the solution being to repair the particular crashed CPU.

In a complex IT infrastructure, the CPU monitor alone would not indicate the critical nature of the CPU to the gross-level rule. Alternatively, the CPU may not even be monitored. However, since embodiments of the present invention consider numerous monitors, the crashed CPU may create recurring monitor patterns even without being directly monitored. Thus, in this example, if the two fingerprints match—meet the resemblance condition,—then the problem that the CPU has again crashed will be inferred. If more than one problem is associated with a given fingerprint, the problems may be ranked according to some statistical likelihood of reoccurrence. For example, if a certain problem has occurred ten times, and each time a fingerprint resembling a historical fingerprint was generated, then that problem is more likely to have reoccurred than a problem that only occurred three times in a similar situation. Furthermore, if more than one historical fingerprint matches the fingerprint, the problems associated with those fingerprints may also be ranked according to some statistical likelihood.

In the illustrated embodiment, a determination is made 410 as to whether the problem inferred was actually correct. This determination may be performed by a technician or in some automated manner. If the inferred problem was the actual problem, then the weights used to compare component indicators are adjusted 412 to reflect the statistical significance of the relationship between some component indicators in the set and the problem. Thus, the monitoring system is able to learn and better predict problems in the future.

In one embodiment of the invention, the weights may be adjusted by increasing or decreasing the existing weight for each monitor depending on the historical standard deviation average for that monitor. For example, if the monitor is outside its historical standard deviation average, a counter $c_{outside}$ may be increased by one. Similarly, if the monitor is inside its historical standard deviation average, a counter $c_{inside}$ may be increased by one. Then, if $$c_{outside} > c_{inside}, \text{ then Weight } w = w + \left(\left(\frac{c_{outside}}{c_{outside} + c_{inside}}\right)\left(\frac{1-w}{2}\right)\right),$$

otherwise if $$c_{outside} < c_{inside}, \text{ then Weight } w = w - \left(\left(\frac{c_{inside}}{c_{outside} + c_{inside}}\right)\left(\frac{w}{2}\right)\right).$$

Numerous other calculations may be performed for adjusting the weights.

If the inferred problem was not the actual problem, then the weights used to compare component indicators are adjusted 414 to reflect the possibly decreased statistical significance of some component indicators in the set and the problem. If the real cause of the problem is determined, it may be associated with the indicator set 416 for future reference at a time when the indicator has been stored as a historical indicator set. At first, the correlation between the problem and the indicator set may not be strong, but over time as the problem reoccurs and the weights get adjusted repeatedly, this correlation may increase significantly. For example, it may increase to a level where a new indicator set resembling the now historical indicator set means the same problem occurred with a 90 percent probability.

If the indicator set did not resemble any of the historical indicator sets to a sufficient degree, then the set may be stored 418, and associated with a problem if one is found 420, as described above.

The following example further demonstrates the problem inference process. In an on-line B2B ordering process, one task is to determine the correct pricing for an order line item. This generally may involve a synchronous method call through an Enterprise Application Integration (EAI) server that, in turn, invokes a transaction server method call in an Enterprise Resource Planning (ERP) system. The ERP system then accesses a database to retrieve the pricing information, perform appropriate calculations, and return the result. There may be two different historical fingerprints associated with poor response time in getting pricing information. The component indicators of one historical fingerprint may show correlation to CPU performance and memory utilization on the ERP server. The problem associated with this fingerprint may be: "Concurrent batch processes impacting real-time request performance." The second historical fingerprint may show a correlation to the performance of a database using component indicators showing that the ERP CPU Input/Output wait time is abnormally high, the database server CPU utilization is abnormally low, the database server memory utilization is abnormally high, and the database cache hit ratio is lower than normal. This second fingerprint may be associated with a problem described by a user as: "Database is not performing well, necessary data not found in buffer cache." If the new indicator set sufficiently resembles, i.e., matches, the one of the historical fingerprints, the problem described by the user may be inferred.

Figure 5A:
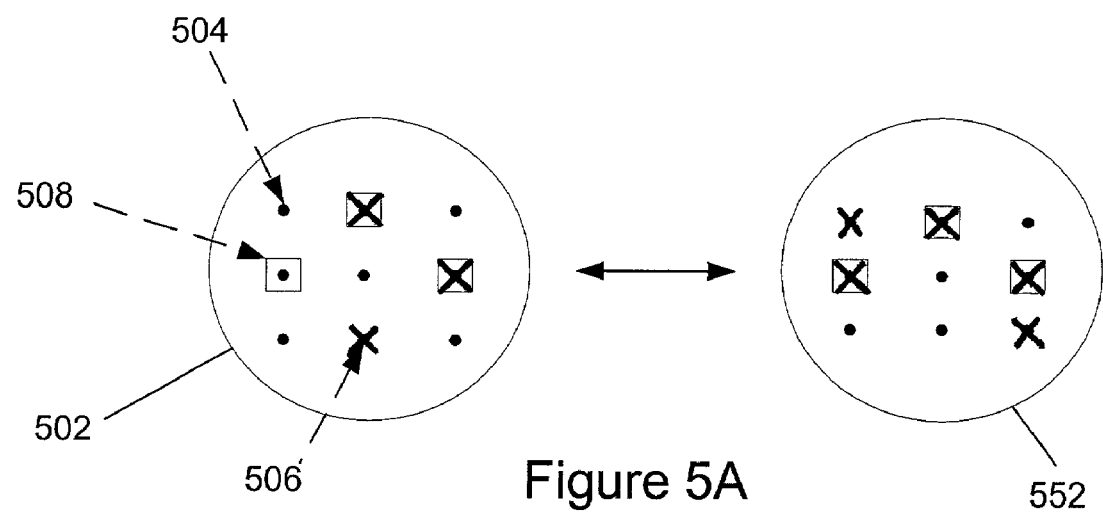
FIG. 5A is a pictorial representation of a fingerprint according to one embodiment of the present invention.
Figure 5B:
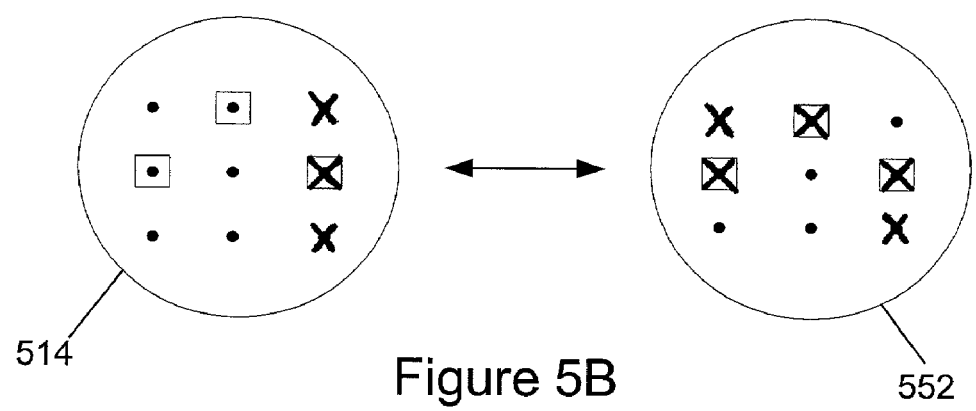
FIG. 5B is a pictorial representation of a fingerprint according to one embodiment of the present invention.

An exemplary method of determining resemblance between indicator sets is now described with reference to FIGS. 5A and 5B. FIG. 5A shows the indicator set 502 being compared with historical indicator set 552. Each dot 504 in the indicator sets represents a component indicator. For simplicity, in this figure the fingerprints only include nine components. The component indicators may be processed measurements. Alternatively, the component indicators may be binary indicators based on whether the components are outside a historical normal range. The corresponding locations within the fingerprint—dots—represent corresponding component indicators. Thus, the top-left component indicator is associated with the same monitor in both of the indicator sets. In FIG. 5A, an X 506 indicates that a component indicator is outside its normal range. This may be the result of the component indicator being above a certain threshold.

In FIG. 5A, a box 508 around a component indicator dot 504 represents that the weight of the component indicator is above a certain threshold. These weights, used for comparing fingerprints, may be kept for each component indicator. The weights may be used to show the relevance of a component indicator in the indicator set. For example, the lower-left component indicator in FIG. 5A does not have a box around it. This may mean that this component indicator is not strongly correlated with a problem associated with fingerprint 552. For example, if this component indicator indicates CPU speed, and about half the time a particular problem associated with fingerprint 552 arises, the CPU speed is normal, and the other half of the time it is not normal, then the CPU speed appears to have little effect on whether the problem has occurred yet again. Thus, in one embodiment, the weight of that component indicator in that historical fingerprint may be low, indicating a low correlation.

Using the weights and the normal range thresholds described above, various conditions for resemblance may be formulated. As an example, one condition may be that if two or more component indicators that have weights above a threshold, i.e., have a box around them, are out of normal range, i.e., have X's, on both the indicator set and the historical indicator set, then the two indicator sets sufficiently resemble each other. According to this condition, indicator set 506 resembles historical indicator set 552 in FIG. 5A. FIG. 5B shows an indicator set 514 that does not sufficiently resemble historical indicator set 552 according to the above resemblance condition. The above specification for resemblance is given by way of example only. There are many alternative ways in which such conditions may be defined or formulated. Any statistical comparison may be used to determine whether the indicator set resembles any of the historical indicator sets.

Figure 6:
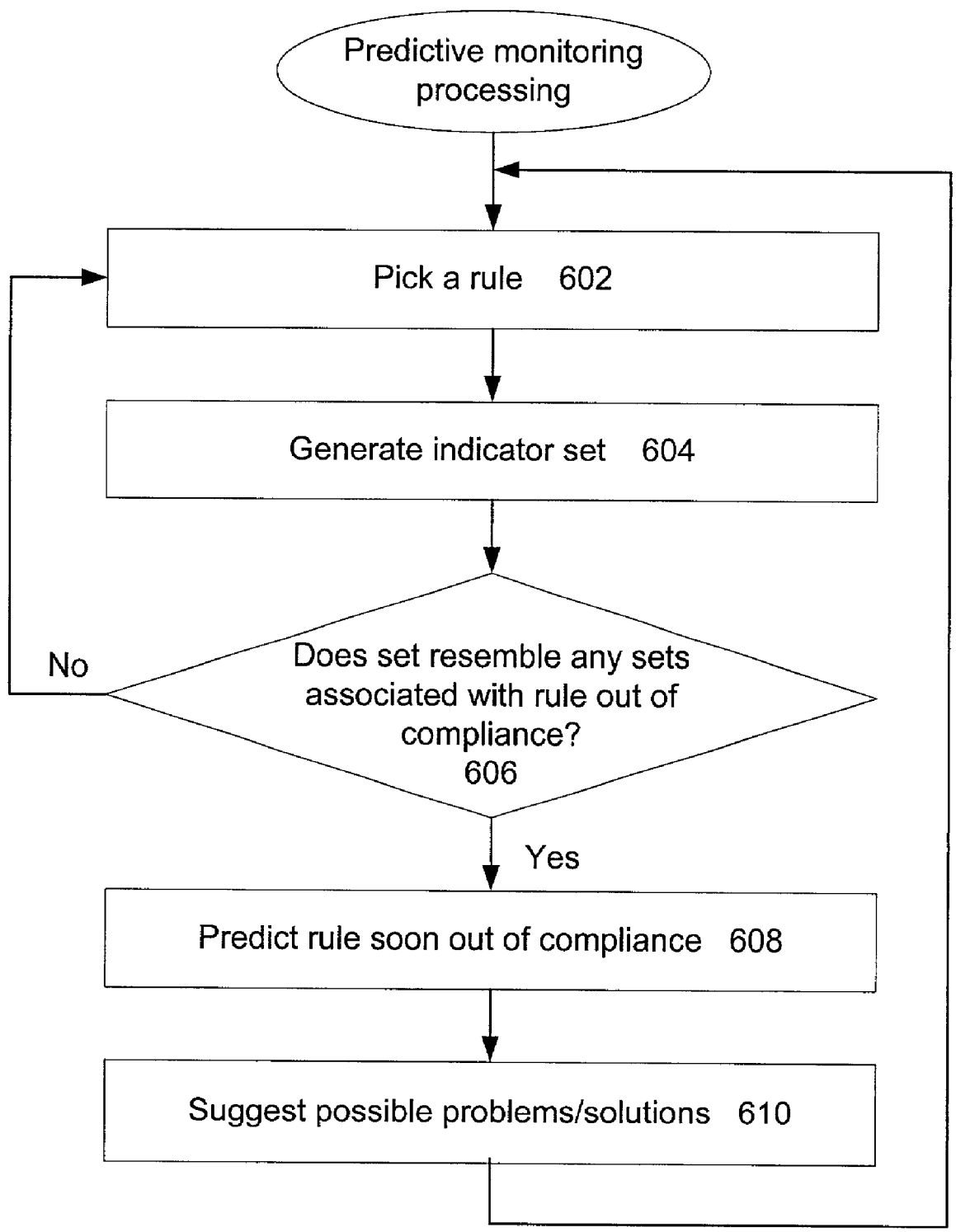
FIG. 6 is a flow chart illustrating out-of-compliance prediction according to one embodiment of the invention.

Some embodiments of the invention that may predict a future out-of-compliance condition before it occurs are now described with reference to FIG. 6. Since, the gross-level rule is not yet out of compliance at the time the monitor data is collected, these embodiments may be used to predict whether the gross-level rule is approaching an out-of-compliance condition. In one embodiment of the invention, the prediction process is periodically performed for each gross-level rule. Thus, the prediction process according to one embodiment of the invention may begin with the selection 602 of a particular gross-level rule.

Then, an indicator set for the selected gross-level rule may be generated 604 in any of the ways described above with reference to FIG. 3. Next, the indicator set is compared 606 to historical indicator sets in the manner described with reference to FIG. 4. As discussed with reference to FIG. 4, the comparison 606 determines whether there is sufficient resemblance between the indicator set and at least one historical indicator set. This resemblance condition may be different from the resemblance condition used above with reference to FIG. 4, or it may be the same resemblance condition. The historical indicator sets may have been generated at a time when the gross-level rule was out of compliance. If the indicator set does not sufficiently resemble any of the historical indicator sets, then no prediction is made about the gross-level rule. The process may begin again by a selection 602 of another gross-level rule.

However, if the indicator set does match, i.e., sufficiently resemble, a historical fingerprint, then it is predicted that the IT infrastructure may soon experience an out-of-compliance condition regarding the gross-level rule. That is, it is predicted 608 that the gross-level rule may soon be out of compliance. In one embodiment of the invention, the monitoring system may then infer 610 potential problems, fixes, or solutions associated with the particular historical fingerprint or fingerprints, similar to the process described with reference to FIG. 4.

In one embodiment of the invention, whenever a gross-level rule goes out of compliance, the indicator set generated at that time is stored and associated with the out of compliance condition. Indicator sets that are very similar may not need to be stored independently, but may be represented by weighing the historical indicator sets. For example, a historical indicator set whose statistical equivalents have been generated 90 percent of the time the gross-level rule went out of compliance may have a high weight. Statistical equivalents may be defined as those fingerprints judged sufficiently similar by the comparison process. Many alternative weighing schemes are possible that emphasize a historical indicator set. Stated another way, these weights may indicate the reliability or quality of the predictive indicator set. Such a high quality historical indicator set may be referred to as a predictive fingerprint. If fingerprints generated while the gross-level rule is in compliance begin to resemble the predictive fingerprint, the out-of-compliance condition associated with the fingerprint is predicted to be approaching.

General Matters

In the description above, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various processes. The processes of the embodiments of the present invention may be performed by hardware components, or may be embodied in machine-executable instructions, which may be used to cause a general-purpose or special-purpose processor or logic circuits programmed with the instructions to perform the processes. Alternatively, the processes may be performed by a combination of hardware and software.

Embodiments of the present invention may be provided as a computer program product, which may include a machine-readable medium having stored thereon instructions, which may be used to program a computer or other electronic device to perform a process according to an embodiment of the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

In the description above, embodiments of the Indicator Engine has been described as receiving raw monitor data that it converts and processes into fingerprints. However, the monitor data may not be raw data, but may be pre-processed data. For example, the monitors may perform some or all of the statistical analysis needed to create the component indicators. Furthermore, the Indicator Engine need not reside on a single machine, but may be distributed throughout the IT infrastructure.

In the description above, in some embodiments, a historical fingerprint associated with an out-of-compliance condition is described as having been generated when the corresponding gross-level rule was out of compliance. However, the historical fingerprint may have been generated at any time before or after the beginning of the out-of-compliance condition, so long as the temporal relation implies a sufficient statistical relation. Furthermore, historical fingerprint chains corresponding to the procession of fingerprints that led to the out-of-compliance condition may also be stored, and used in the comparisons to determine whether a fingerprint resembles historical fingerprints, or whether a fingerprint chain currently occurring resembles a historical fingerprint chain.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

The invention claimed is:

1. A method comprising:
   receiving a plurality of component metrics, each component metric corresponding to a component of a plurality of components of an information technology (IT) infrastructure of an enterprise, and each component of the plurality of components being associated with one or more gross-level rules;
   generating an indicator set representative of a current state of the IT infrastructure by comparing each received component metric to relevant historical values of the component metric;
   using the indicator set to diagnose an existing condition or predict a future condition within the IT infrastructure;
   determining that a gross-level rule is out of compliance;
   comparing the indicator set to one or more historical indicator sets to determine whether the indicator set resembles any of the one or more historical indicator sets;
   performing an appropriate action based on the result of the comparison; and
   wherein, if the indicator set resembles at least one of historical indicator set, performing the appropriate action comprises inferring a problem associated with the at least one historical indicator set.

2. The method of claim 1, further comprising:
   receiving information confirming whether the inferred problem has occurred; and
   adjusting a plurality of weights used for comparing the indicator set to one or more historical indicator sets, each weight being associated with one component indicator of the indicator set, based on the received information.

3. The method of claim 1, wherein, if the indicator set does not resemble any of the one or more historical indicator sets, performing the appropriate action comprises:
   storing the indicator set; and
   associating the indicator set with a problem.

4. The method of claim 1, wherein the comparing the indicator set to one or more historical indicator sets comprises comparing a plurality of component indicators of the indicator set with a plurality of component indicators of each historical indicator set using a plurality of weights.

5. The method of claim 4, wherein the indicator set resembles any of the one or more historical indicator sets if a critical number of component indicators are outside a historical range in both the indicator set and any one of the one or more historical indicator sets.

6. The method of claim 5, wherein the critical number of component indicators have a threshold weight associated with each component indicator.

7. The method of claim 1, wherein performing the appropriate action comprises predicting that the gross-level rule may be out of compliance in the future if the indicator set resembles at least one of the one or more historical indicator sets, the at least on historical indicator set being associated with the gross-level rule being out of compliance.

8. The method of claim 1, wherein performing the appropriate action comprises predicting that a condition may occur in the future if the indicator set resembles at least one of the one or more historical indicator sets, the at least one historical indicator set being associated with the condition.

9. The method of claim 1, wherein the plurality of component metrics are synchronized in time.

10. The method of claim 1, wherein the plurality of component metrics are synchronized in time with the determination that the gross-level rule is out of compliance.

11. The method of claim 1, wherein comparing each component metric to relevant historical values of the component metric comprises calculating a measure of normal variation using the relevant historical values.

12. The method of claim 11, wherein the measure of normal variation comprises one or more of a standard deviation, percent deviation, from-mean deviation, trend analysis.

13. The method of claim 1, wherein the relevant historical values of the component metric depend on at least one of a time of a day, a day of a week, a period of a month, a period of a year.

14. The method of claim 1, wherein generating the indicator set comprises:
   calculating a plurality of component statistics by comparing each component metric to relevant historical values of the component metric; and
   generating the indicator set by calculating a set of component indicators by normalizing each calculated statistic.

15. A machine-readable medium having stored thereon data representing instructions that, when executed by a processor, cause the processor to perform operations comprising:
- receiving a plurality of component metrics, each component metric corresponding to a component of a plurality of components of an information technology (IT) infrastructure of an enterprise, and each component of the plurality of components being associated with one or more gross-level rules;
- generating an indicator set representative of a current state of the IT infrastructure by comparing each received component metric to relevant historical values of the component metric;
- using the indicator set to diagnose an existing condition or predict a future condition within the IT infrastructure;
- determining that a gross-level rule is out of compliance;
- comparing the indicator set to one or more historical indicator sets to determine whether the indicator set resembles any of the one or more historical indicator sets;
- performing an appropriate action based on the result of the comparison; and
- wherein, if the indicator set resembles at least one of historical indicator set, performing the appropriate action comprises inferring a problem associated with the at least one historical indicator set.

16. The machine-readable medium of claim 15, wherein the instructions further cause the processor to perform operations comprising:
- receiving information confirming whether the inferred problem has occurred; and
- adjusting a plurality of weights used for comparing the indicator set to one or more historical indicator sets, each weight being associated with one component indicator of the indicator set, based on the received information.

17. The machine-readable medium of claim 15, wherein, if the indicator set does not resemble any of the one or more historical indicator sets, performing the appropriate action comprises:
- storing the indicator set; and
- associating the indicator set with a problem.

18. The machine-readable medium of claim 15, wherein the comparing the indicator set to one or more historical indicator sets comprises comparing a plurality of component indicators of the indicator set with a plurality of component indicators of each historical indicator set using a plurality of weights.

19. The machine-readable medium of claim 18, wherein the indicator set resembles any of the one or more historical indicator sets if a critical number of component indicators are outside a historical range in both the indicator set and any one of the one or more historical indicator sets.

20. The machine-readable medium of claim 19, wherein the critical number of component indicators have a threshold weight associated with each component indicator.

21. The machine-readable medium of claim 15, wherein performing the appropriate action comprises predicting that the gross-level rule may be out of compliance in the future if the indicator set resembles at least one of the one or more historical indicator sets, the at least on historical indicator set being associated with the gross-level rule being out of compliance.

22. The machine-readable medium of claim 15, wherein performing the appropriate action comprises predicting that a condition may occur in the future if the indicator set resembles at least one of the one or more historical indicator sets, the at least one historical indicator set being associated with the condition.

23. The machine-readable medium of claim 15, wherein the plurality of component metrics are synchronized in time.

24. The machine-readable medium of claim 15, wherein the plurality of component metrics are synchronized in time with the determination that the gross-level rule is out of compliance.

25. The machine-readable medium of claim 15, wherein comparing each component metric to relevant historical values of the component metric comprises calculating a measure of normal variation using the relevant historical values.

26. The machine-readable medium of claim 25, wherein the measure of normal variation comprises one or more of a standard deviation, percent deviation, from-mean deviation, trend analysis.

27. The machine-readable medium of claim 15, wherein the relevant historical values of the component metric depend on at least one of a time of a day, a day of a week, a period of a month, a period of a year.

28. The machine-readable medium of claim 15, wherein generating the indicator set comprises:
- calculating a plurality of component statistics by comparing each component metric to relevant historical values of the component metric; and
- generating the indicator set by calculating a set of component indicators by normalizing each calculated statistic.

29. An information technology (IT) infrastructure monitoring apparatus comprising:
- a storage medium having stored thereon one or more routines configured to receive a plurality of component metrics each corresponding to a component of a plurality of components of an information technology (IT) infrastructure of an enterprise, generate an indicator set representative of a current state of the IT infrastructure, and use the indicator set to diagnose an existing condition or predict a future condition within the IT infrastructure; and
- a processor coupled to the storage medium to execute one or more routines, where:
- each component of the plurality of components are associated with one or more gross-level rules;
- the indicator set is generated by comparing each received component metric to relevant historical values of the component metric;
- determine that a gross-level rule is out of compliance;
- compare the indicator set to one or more historical indicator sets to determine whether the indicator set resembles any of the one or more historical indicator sets;
- perform an appropriate action based on the result of the comparison; and
- wherein, if the indicator set resembles at least one of historical indicator set, performing the appropriate action comprises inferring a problem associated with the at least one historical indicator set.

30. The apparatus of claim 29, wherein the one or more routines are further configured to:
- receive information confirming whether the inferred problem has occurred; and
- adjust a plurality of weights used for comparing the indicator set to one or more historical indicator sets, each weight being associated with one component indicator of the indicator set, based on the received information.

31. The apparatus of claim 29, wherein, if the indicator set does not resemble any of the one or more historical indicator sets, performing the appropriate action comprises:
    storing the indicator set; and
    associating the indicator set with a problem.

32. The apparatus of claim 29, wherein the comparing the indicator set to one or more historical indicator sets comprises comparing a plurality of component indicators of the indicator set with a plurality of component indicators of each historical indicator set using a plurality of weights.

33. The apparatus of claim 32, wherein the indicator set resembles any of the one or more historical indicator sets if a critical number of component indicators are outside a historical range in both the indicator set and any one of the one or more historical indicator sets.

34. The apparatus of claim 33, wherein the critical number of component indicators further have greater than or equal to a threshold weight associated with each component indicator.

35. The apparatus of claim 29, wherein performing the appropriate action comprises predicting that the gross-level rule may be out of compliance in the future if the indicator set resembles at least one of the one or more historical indicator sets, the at least on historical indicator set being associated with the gross-level rule being out of compliance.

36. The apparatus of claim 29, wherein performing the appropriate action comprises predicting that a condition may occur in the future if the indicator set resembles at least one of the one or more historical indicator sets, the at least one historical indicator set being associated with the condition.

37. The apparatus of claim 29, wherein the plurality of component metrics are synchronized in time.

38. The apparatus of claim 29, wherein the plurality of component metrics are synchronized in time with the determination that the gross-level rule is out of compliance.

39. The apparatus of claim 29, wherein comparing each component metric to relevant historical values of the component metric comprises calculating a measure of normal variation using the relevant historical values.

40. The apparatus of claim 39, wherein the measure of normal variation comprises one or more of a standard deviation, percent deviation, from-mean deviation, trend analysis.

41. The apparatus of claim 29, wherein the relevant historical values of the component metric depend on at least one of a time of a day, a day of a week, a period of a month, a period of a year.

42. The apparatus of claim 29, wherein generating the indicator set comprises:
    calculating a plurality of component statistics by comparing each component metric to relevant historical values of the component metric; and
    generating the indicator set by calculating a set of component indicators by normalizing each calculated statistic.

43. A method comprising:
    maintaining a database of a plurality of historical fingerprints, each of the plurality of historical fingerprints corresponding to an out-of-compliance condition of a gross-level rule of a plurality of gross-level rules, each of the plurality of gross-level rules representing an expected or desired functioning of an information technology (IT) infrastructure of an enterprise, each of the plurality of historical fingerprints associated with one or more of:
        an indication of one or more problems that existed in the IT infrastructure when the historical fingerprint was generated and that were believed to have been responsible for or contributed to the corresponding out-of-compliance condition of the gross-level rule, and
        an indication of one or more fixes or solutions that were performed during the corresponding out-of-compliance condition of the gross-level rule and that were believed to have been responsible for or contributed to bringing the gross-level rule back into compliance;
    determining that a gross-level rule of the plurality of gross-level rules is out of compliance;
    responsive to said determining that a gross-level rule of a plurality of gross-level rules is out of compliance, generating a current fingerprint for the out-of-compliance gross-level rule by gathering data from a plurality of component monitors regarding a plurality of components of the IT infrastructure, each of the plurality of components being associated with the out-of-compliance gross-level rule; and
    inferring a problem, a fix or a solution associated with the out-of-compliance gross-level rule by comparing the current fingerprint to the plurality of historical fingerprints and identifying a historical fingerprint of the plurality of historical fingerprints that sufficiently resembles the current fingerprint by performing a weighted comparison of a plurality of component indicators of the current fingerprint and a plurality of component indicators of one or more of the plurality of historical fingerprints.

44. The method of claim 43, further comprising responsive to receiving confirmation regarding correctness of the inferred problem, the inferred fix or the inferred solution, increasing the statistical significance of one or more component indicators by adjusting weightings of the component indicators within the identified historical fingerprint.

45. The method of claim 43, further comprising responsive to receiving confirmation regarding incorrectness of the inferred problem, the inferred fix or the inferred solution, decreasing the statistical significance of one or more component indicators by adjusting weightings of the component indicators within the identified historical fingerprint.

46. The method of claim 43, further comprising causing information regarding the inferred problem, fix or solution to be conveyed to a technician having responsibility for maintaining the IT infrastructure.

47. The method of claim 43, further comprising programmatically taking corrective action to remedy the inferred problem.

* * * * *